UNITED STATES PATENT OFFICE.

MAX MORITZ FERDINAND RICHTER, OF HAMBURG, GERMANY.

COMPOSITION FOR PACIFYING WAVES OF THE SEA.

SPECIFICATION forming part of Letters Patent No. 519,161, dated May 1, 1894.

Application filed December 9, 1893. Serial No. 493,282. (No specimens.)

*To all whom it may concern:*

Be it known that I, MAX MORITZ FERDINAND RICHTER, a subject of the King of Prussia, residing at Hamburg, in the German Empire, have invented certain new and useful Improved Means for Pacifying the Waves of the Sea, of which the following is a specification.

My invention relates to improvements in the means for pacifying the waves of the sea for the protection of the ships or vessels. For this purpose oils of different kinds have been hitherto employed, viz—animal oils, such as fish-oils, vegetable oils such as linseed oil, cotton seed oil, &c., and also the so called mineral oils, as for instance petroleum. In practice it has however been proved, that the efficiency of these oils decreases according to the higher degree of their purity, that is to say, the more inferior, impure and also viscid the oil is, the greater is its power for pacifying the sea waves. For this reason amply purified oil used in food, such as sesam-oil, olive-oil, &c., also an amply rectified petroleum, as well as such oils, which become solid at low temperatures are useless for the desired purpose. The animal and vegetable oils consist principally of fatty acid glycerides, the mineral oils of liquid hydrocarbons.

From exhaustive experiments it has been proved, that the power of pacifying waves is simply and solely attributed to the small quantity of liquid fatty acids contained in these oils. Such fatty acids may be found for instance in the olive-oil in natural state of the latter, or they are formed from the fatty acid glycerides obtained in a well known manner on smelting the oils or fats at a considerable high temperature and thereby decomposing the glycerides into glycerine and free fatty acids. The crude petroleum also contains small quantities (about one-fourth to one and one-fourth per cent.) of liquid fatty acids (oleic acid). On distilling such an effective crude petroleum, the residue in which the liquid fatty acids are contained, but not the distillate, will exert the power of pacifying waves. As a proof, that this phenomenon is simply and solely produced by even minute quantities of the liquid fatty acids, *f. i.* the oleic acid, it may be mentioned, that an entirely inefficient petroleum will forthwith obtain the property of calming the waves by adding thereto about 0.1 per cent. oleic acid. To afford the same proof but in the reverse sense it may be noted that an amply acting oil to be composed of ninety-nine per cent. fatty acid glycerides and one per cent. free oleic acid will lose its property of calming the sea as soon as this one per cent. oleic acid has been taken away. Besides the oleic acid the same property of pacifying waves is due to the liquid fatty acids of the orders $C_nH_{2n-2}O_2, C_nH_{2n-4}O_2, C_nH_{2n-6}O_2, C_nH_{2n-2}O_3, C_nH_{2n-4}O_3$, &c., as for instance, linoleic acid, ricinoleic acid, hempoleic acid, physetoleic acid, &c.

Physically speaking extensive experiments have shown that the thickness of the film of oleic acid on the water does at times not exceed 0.000002 millimeter, also that the oleic acid is soluble in river water in about the proportion of one to eleven thousand, in distilled water in the proportion of about one to eight thousand and in salt or sea water in the proportion of about one to twenty-six thousand; also that the distribution or spreading power of the oleic acid on the surface of the water is due to its degree of solubility in water, and finally that the quieting or pacifying of agitated waters of the sea is due to the simple phenomenon of diffusion.

The liquid fatty acids referred to may be used in a pure state or in the form of a solution in a suitable solvent, as petroleum, and if desired or necessary for the purpose of increasing the adhesion, said acids may be mixed with a so-called distributer, which of course must be a body readily soluble in petroleum as well as in sea water.

For the purpose of promoting the distribution of the fatty acids various bodies may be employed, as for instance the anhydrous alcohols, as amyl alcohol. Instead of petroleum, the fatty acids may be dissolved in active alcohols, as methyl alcohol, spirits, &c., or etheric oils, as the turpenes, camphor oils or rosin oils may be used as a solvent for the oleic acid, in all of which the latter is active. Inasmuch as oleic acid congeals at about 0° centigrade, a solution of fatty acid in the substances named possesses the advantage that it can be used under almost any atmospheric temperature, even at a temperature as low as −20°, and that it can be made of a uniform composition without difficulty and at any time. This supposition will not occur with the oils in common trade, as the same are unequally composed according to their nature and mode of production and in most cases become already solid at 4° centigrade in consequence of their contents of solid stearic acid glyceride, palmitic acid glyceride, margaric acid glyceride, &c., and will therefore be useless for the desired purpose.

Having fully described my invention, what I claim, and desire to secure by Letters Patent, is—

1. Means for pacifying the waves of the sea, consisting of an unsaturated fatty acid or a solution thereof in a liquid free from or naturally containing but a small proportion of such acid in a free state, substantially as set forth.

2. Means for pacifying the waves of the sea, which consist of an unsaturated fatty acid, as oleic acid, or a solution thereof in a liquid free from or naturally containing but a small proportion of such acid in a free state and a substance adapted to act as a distributer soluble in the solvent and in water, as amyl-alcohol.

3. A method of pacifying the waves of the sea, which consists in spreading on the waters an unsaturated fatty acid, as oleic acid, substantially as set forth.

4. A method of pacifying the waves of the sea, which consists in dissolving an unsaturated fatty acid in a liquid free from or containing naturally but a small proportion of such acid, adding to the solution a substance soluble in the acid solvent as well as in water and adapted to act as a distributer as amyl alcohol and spreading the solution on the waters, substantially as set forth.

In testimony that I claim the foregoing as my invention I have signed my name, in presence of two witnesses, this 25th day of November, 1893.

MAX MORITZ FERDINAND RICHTER.

Witnesses:
ALEXANDER SPECHT,
DIEDRICH PETERSEN.